UNITED STATES PATENT OFFICE.

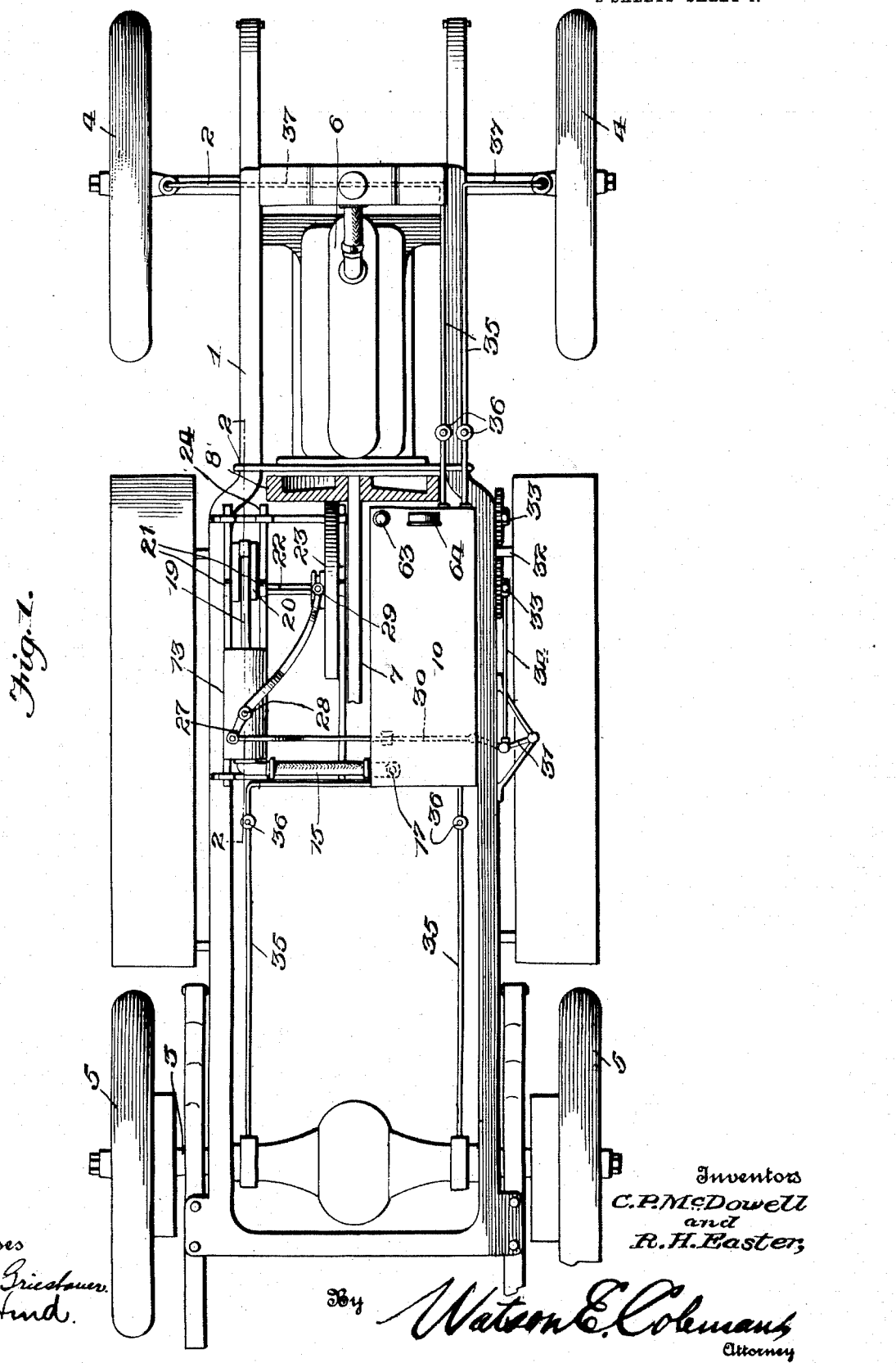

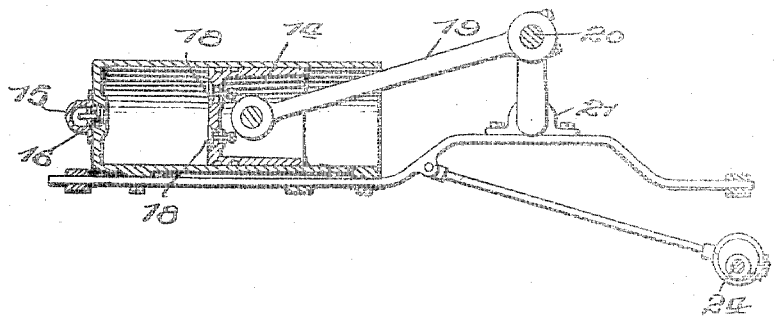
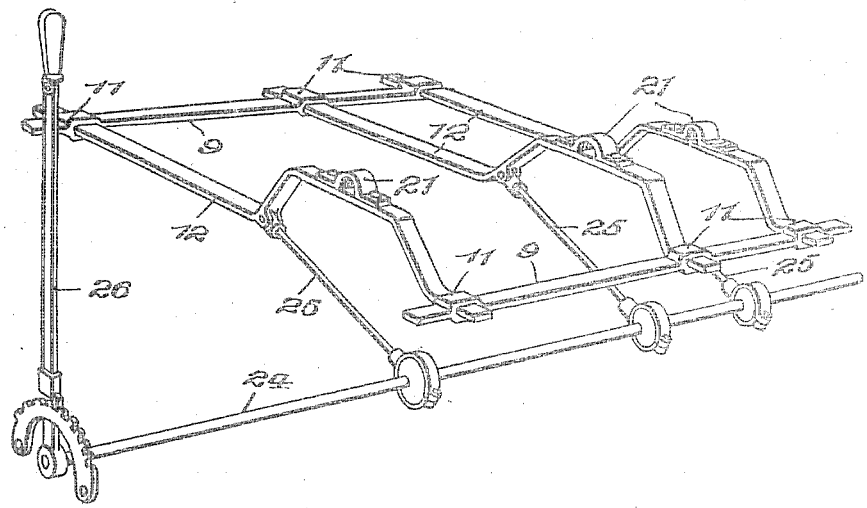

CHARLES P. McDOWELL AND RICHARD H. EASTER, OF PORTER, WASHINGTON.

AUTOMOBILE TIRE-PUMP.

1,098,674. Specification of Letters Patent. Patented June 2, 1914.

Application filed September 19, 1912. Serial No. 721,292.

*To all whom it may concern:*

Be it known that we, CHARLES P. McDOWELL and RICHARD H. EASTER, citizens of the United States, residing at Porter, in the county of Chehalis and State of Washington, have invented certain new and useful Improvements in Automobile Tire-Pumps, of which the following is a specification, reference being had to the accompanying drawings.

The present invention comprehends new and useful improvements in motor vehicles and relates particularly to an air system for circulating air within the pneumatic tires of the vehicle.

The primary object of the present invention taken in its broadest conception is to provide motor driven vehicles with a storage tank whereby air may be circulated within the pneumatic tires of the vehicle at all times at a given pressure.

A further object of the present invention in a less broad conception is the provision of mechanism being in operative connection with the motor of the vehicle and a system of passage ways leading to the pneumatic tires of the vehicle whereby air may be inserted therein at predetermined intervals or continuously as desired.

Other objects will be apparent hereinafter as the description continues and the invention also aims to generally improve this class of devices rendering them commercially desirable.

With the above and other objects in view the invention consists of novel details of construction, combination, formation and arrangement of parts as will be hereinafter more fully described, claimed and more particularly pointed out in the accompanying drawings in which—

Figure 1 is a plan view of an automobile frame illustrating an embodiment of my invention; Fig. 2 is a detail longitudinal section taken on the line 2—2 of Fig. 1; Fig. 3 is a detail perspective view of the auxiliary air pump supporting frame and the means for operating the same.

Reference now being had more specifically to the accompanying drawings wherein like and corresponding parts are designated by like numerals throughout the several views the numeral 1 indicates the frame work of an ordinary motor vehicle fixed to the forward end thereof the front axle 2 and rotatably mounted at the rear end thereof the driving axle 3. The said front axle 2 being provided with the usual steering wheels 4, and the rear axle having keyed thereto the usual driving wheels 5. A motor 6 which is preferably an internal combustion engine is mounted within the forward end of the frame 1 and has extending therefrom the usual driving shaft 7 which is operatively connected by means of the transmission gear to the rear driving axle in the usual manner. Keyed upon the main shaft 7 is the usual fly wheel 8 which will be used in conjunction with the present invention as will be hereinafter more fully described. The aforesaid parts being of the well known construction of an ordinary motor vehicle but the present invention resides in mechanism which is used in conjunction with the said parts as hereinafter fully described. Extending transversely of the frame 1 adjacent the motor 6 are a plurality of bars 9, but being preferably three in number. Mounted upon these bars adjacent one side of the vehicle is a pressure tank 10 and also slidably mounted within bearings 11 formed upon these bars are longitudinally extending bars 12 which are preferably three in number and have mounted thereupon an air pump 13.

The air pump 13 consists generally of a cylinder which is mounted adjacent one end of the beams 12 and has reciprocally mounted therein a piston 14. The rear end of the cylinder is in communication with the pressure tank 10 by means of a flexible tubing 15. A check valve 16 is mounted within the rear end of the cylinder and a similar valve 17 is mounted within the pressure tank and the purpose of which will be hereinafter fully described. The piston 14 has formed therein a pair of diametrically opposite openings which are adapted to be closed by means of check valves 18. A piston rod 19 extends from the piston in the usual manner and is operatively connected to a crank shaft 20 which is journaled as at 21 within bearings mounted upon the upper face of the longitudinal beams 12. This crank shaft 20 is square in cross-section adjacent one end thereof as at 22 and has slidably mounted thereupon a pulley 23. The outer periphery of the pulley 23 frictionally engages one face of the fly wheel 8 whereby upon the rotation of the fly wheel 8 through the instrumentality of the motor the pulley 23 will also be rotated thereby imparting a rotatory motion to the crank shaft 20, which will also in turn reciprocate the piston 14 within the air pump.

To provide means for throwing the pulley 23 into and out of operative engagement with the fly wheel 8, we provide means for reciprocating the longitudinal extending beams 12. This means comprises a transversely extending shaft 24 which is journaled within suitable bearings mounted upon the main frame of the vehicle and this shaft has keyed therewith a plurality of eccentrically mounted disks from which extend arms 25 being connected at their opposite ends to the beams 12. The outer end of this shaft 24 is provided with a crank handle 26 being available to the operator whereby rotating the said shaft the frame comprising the longitudinally extending beams 12 will be reciprocated thereby positively throwing the pulley 23 into and out of engagement with the fly wheel 8.

To provide means for increasing and reducing the speed of the crank shaft 20 we provide a system of levers which are operatively connected to the pulley 23 for sliding the same upon the squared portion 22 of the crank shaft whereby the outer periphery of the pulley will be moved to and from the center of the fly wheel 8. This system of levers consists of a lever 27 pivotally mounted as at 28 upon the cylinder casing and having the longer arm thereof forked as at 29 which is adapted to partly encircle a groove formed within the sleeve of the pulley 23. The shorter arm of the lever 27 has connected thereto a rod 30 being slidably mounted within bearings mounted upon the lower face of the pressure tank and this rod is connected at its opposite end to toggle levers 31. A hand lever 32 is pivotally mounted at its lower end within a bearing bracket 33 supported by the frame of the vehicle and this lever is connected to the toggle levers 31 by means of a link 34. It will be seen from the foregoing that by operating the hand lever 32 the lever 27 will also be operated thereby sliding the pulley 23 upon the crank shaft for the purpose as before described.

Connected to the pressure tank 10 are a plurality of passage ways 35 being preferably four in number as shown or as many as wheels for supporting the motor vehicle. Each of these passageways 35 are provided with turning valves 36 which may be operated by means extending adjacent the driver's seat but which are not shown. Extending from the passageways 35 are passageways 37 which lead to the tires of the steering wheels as will be later described.

The pressure tank 10 has leading therefrom a pipe 63 to which a suitable air signal device, not shown, may be applied and this tank is also provided with a gage 64 whereby the pressure contained within the tank and the tires of the vehicle may be readily ascertained.

It is thought from the foregoing that further description of the present invention is deemed unnecessary as the same will be readily understood by those skilled in the art. It is to be further understood that other minor details as to changes in form, formation, operation and arrangement of parts may be resorted to that come within the scope of the appended claims without departing from the spirit of the present invention.

What we claim is—

1. In a device of the character described, the combination with a motor vehicle frame, a supplemental frame slidably mounted upon said motor vehicle frame, an air pump carried by said supplemental frame, a crank shaft carried by said supplemental frame and operatively connected with the piston of said air pump, a pulley slidable upon said crank shaft, said pulley being slidable in a direction at right angles to the direction of movement of said supplemental frame, and means for moving said pulley on said crank shaft, as and for the purpose described.

2. In a device of the character described, the combination with a motor vehicle frame, a tank supported upon said frame, a supplemental frame slidably mounted upon said frame, an air pump carried by said supplemental frame and in communication with said tank, a pulley operatively connected with said air pump, said pulley being slidable in a direction at right angles to the direction of movement of said supplemental frame, means for moving said frame and operatively connecting said pulley with the motor of a vehicle, and means for moving said pulley to increase or decrease the speed of said pulley, as and for the purpose described.

3. In a device of the character described, the combination with a vehicle frame having a motor thereon including a friction pulley, a supplemental frame slidably mounted upon the vehicle frame and adapted for movement in a direction toward and from the friction pulley, a pump carried by said supplemental frame, a crank shaft carried by said supplemental frame and operatively connected with the piston of such pump, a pulley operatively connected with such shaft, and manually operated means for imparting movement to the supplemental frame whereby the pulley of the shaft may be brought into or out of engagement with the friction pulley of the motor.

4. In a device of the character described, the combination with a motor vehicle frame, a supplemental frame slidably mounted upon said motor vehicle frame, an air pump carried by said supplemental frame, a crank shaft carried by said supplemental frame for operative connection with the piston of said air pump, a pulley slidably mounted upon said crank shaft, means for operatively connecting said pulley with the motor of the vehicle, and means for adjusting said pulley whereby the speed of said pump may be increased or diminished, as and for the purpose described.

5. In a device of the character described, the combination with a vehicle frame having a motor thereon including a friction pulley, a supplemental frame slidably mounted upon the vehicle frame and adapted for movement in a direction toward and from the friction pulley, a pump carried by said supplemental frame, a crank shaft carried by said supplemental frame and operatively connected with the piston of such pump, a pulley operatively connected with such shaft, arms pivotally engaged with the supplemental frame, and means carried by the vehicle frame coacting with such arms for imparting movement to the supplemental frame whereby the pulley on the shaft of such supplemental frame may be brought into or out of engagement with the friction pulley of the motor.

In testimony whereof we hereunto affix our signatures in the presence of two witnesses.

CHARLES P. McDOWELL.
RICHARD H. EASTER.

Witnesses:
  E. S. AVERY,
  ALEX JOLLEY.